US009847960B2

(12) United States Patent
Vohra et al.

(10) Patent No.: US 9,847,960 B2
(45) Date of Patent: Dec. 19, 2017

(54) DYNAMICALLY UPDATING CONTENT IN E-MAIL

(71) Applicant: Microsoft Technology Licensing, LLC, Redmond, WA (US)

(72) Inventors: Rahul Vohra, San Francisco, CA (US); Martin Alexander Kleppmann, Kingston upon Thames (GB); Lee Mallabone, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 14/192,547

(22) Filed: Feb. 27, 2014

(65) Prior Publication Data
US 2015/0244655 A1 Aug. 27, 2015

(51) Int. Cl.
*H04L 12/58* (2006.01)
*G06Q 10/10* (2012.01)
*G06F 3/0481* (2013.01)

(52) U.S. Cl.
CPC ............ *H04L 51/18* (2013.01); *G06Q 10/10* (2013.01); *G06F 3/0481* (2013.01)

(58) Field of Classification Search
CPC ........ H04L 51/18; G06Q 10/10; G06F 3/0481
See application file for complete search history.

(56) References Cited

U.S. PATENT DOCUMENTS

| 7,673,002 | B1* | 3/2010 | Damarla | G06Q 10/107 |
| | | | | 709/206 |
| 2002/0040387 | A1* | 4/2002 | Lessa | H04L 51/34 |
| | | | | 709/206 |
| 2002/0138584 | A1* | 9/2002 | Fujimoto | G06Q 10/107 |
| | | | | 709/206 |
| 2003/0081001 | A1* | 5/2003 | Munro | G06Q 10/107 |
| | | | | 715/752 |
| 2013/0080900 | A1* | 3/2013 | Wilde | G06F 17/30893 |
| | | | | 715/736 |
| 2015/0200894 | A1* | 7/2015 | Gough | G06Q 30/0273 |
| | | | | 715/752 |
| 2015/0278388 | A1* | 10/2015 | Markov | G06F 17/30905 |
| | | | | 715/744 |

* cited by examiner

*Primary Examiner* — Anil N Kumar
(74) *Attorney, Agent, or Firm* — Schwegman Lundberg & Woessner, P.A.

(57) ABSTRACT

Methods and systems of dynamically updating content in e-mail messages are described. In some embodiments, an e-mail message is generated. The e-mail message comprises existing content viewable within an e-mail client and is configured to initiate a modification of the existing content within the e-mail message by the e-mail client subsequent to the e-mail message being downloaded by the e-mail client. The modification of the existing content is viewable within the e-mail client. The generated e-mail message is sent to an e-mail account from which a user can view the e-mail message within the e-mail client. In some embodiments, the e-mail message is further configured to cause the e-mail client to obtain new content from a remote server for use in the modification of the existing content within the e-mail message.

13 Claims, 6 Drawing Sheets

DYNAMICALLY UPDATING CONTENT IN E-MAIL

TECHNICAL FIELD

The present application relates generally to e-mail. In some specific examples, the present disclosure relates to methods, systems and computer program products for dynamically updating content in e-mail messages.

BACKGROUND

E-mail messages can contain content that becomes outdated by the time a user views them. For example an e-mail message may contain information about news events or events related to social network websites to which the recipient of the e-mail message belongs. Because events related to this information may continue to occur after the e-mail message is sent to the recipient, the original information included in the e-mail message may become stale or outdated.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
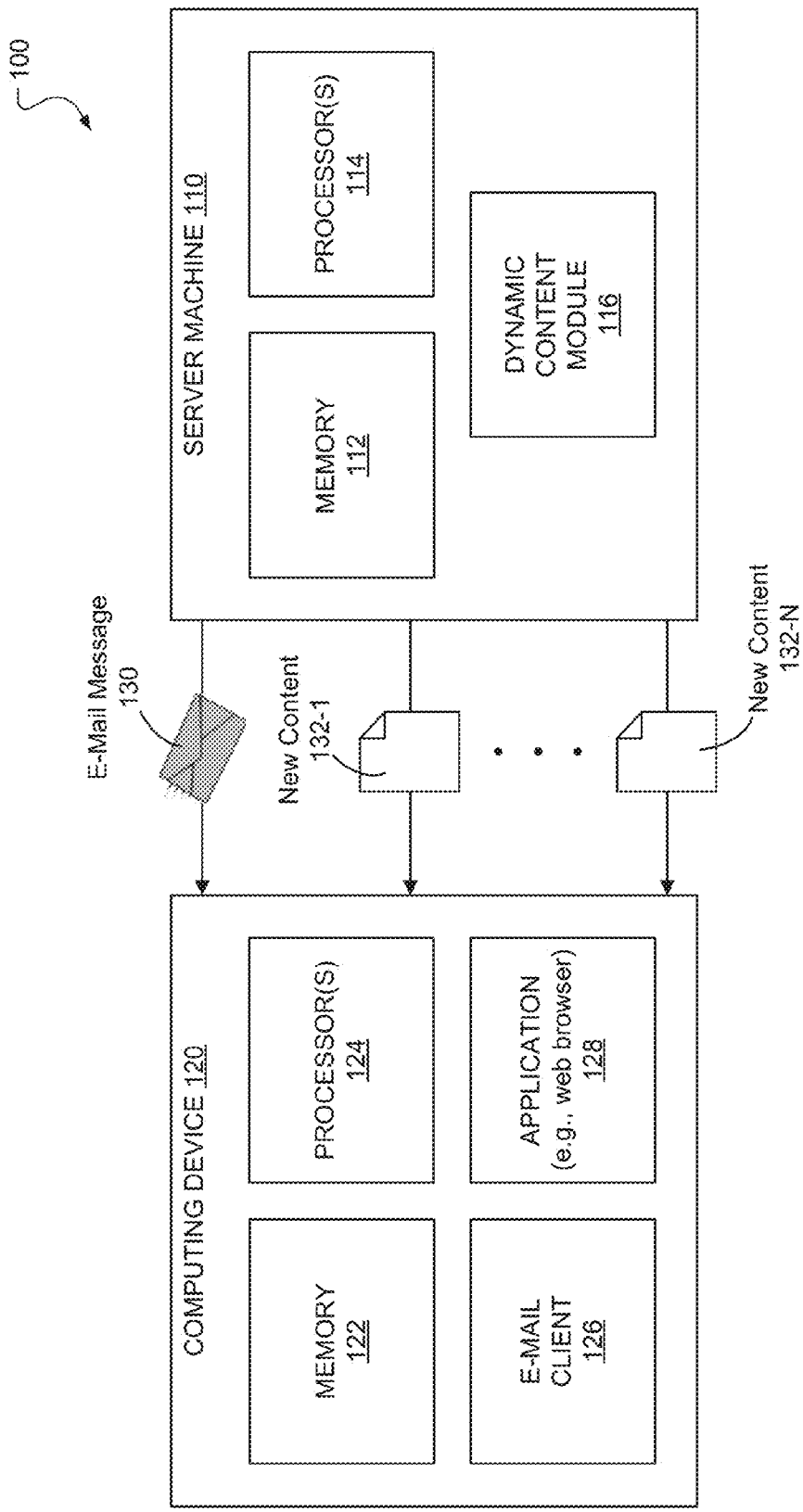
FIG. 1 is a block diagram illustrating a system for dynamically updating content of an e-mail message, in accordance with some embodiments.

Example methods and systems of dynamically updating content in e-mail messages are described. In the following description, for purposes of explanation, numerous specific details are set forth in order to provide a thorough understanding of example embodiments. It will be evident, however, to one skilled in the art that the present embodiments may be practiced without these specific details.

In some embodiments, a method comprises generating an e-mail message comprising existing content viewable within an e-mail client. The e-mail message can be configured to initiate (or trigger) a modification of the existing content within the e-mail message by the e-mail client subsequent to the e-mail message being downloaded by the e-mail client. The modification of the existing content can be viewable within the e-mail client. The generated e-mail message can then be sent to an e-mail account (e.g., an e-mail server on which the account is managed) from which a user can view the e-mail message within the e-mail client.

In some embodiments, the e-mail message is further configured to cause the e-mail client to obtain new content from a remote server for use in the modification of the existing content within the e-mail message. In some embodiments, the e-mail message comprises an IFrame element configured to cause the e-mail client to obtain the new content from the remote server.

In some embodiments, the method further comprises including a meta element in the new content. The meta element can be configured to cause the e-mail client to load a specified Uniform Resource Locator (URL) and to obtain subsequent new content from the specified URL for a subsequent modification of the modified existing content within the e-mail message. In some embodiments, the meta element is further configured to cause the e-mail client to load the specified URL at a specified time. In some embodiments, the method further comprises periodically including a meta element in periodic new content supplied to the e-mail client for use in periodic modifications to the modified existing content within the e-mail message. In some embodiments, the method further comprises determining a stop time at which to finish the periodic modifications to the modified existing content, and causing the termination of the periodic modifications to the modified existing content.

In some embodiments, the new content comprises information from a social networking website. In some embodiments, the existing content comprises a selectable graphical user interface element configured to initiate an action. In some embodiments, the selectable graphical user interface element is configured to cause, in response to its selection, the loading of a page from which the action can be performed.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

FIG. 1 is a block diagram illustrating a system 100 for dynamically updating content of an e-mail message, in accordance with some embodiments. The system 100 may comprise a dynamic content module 116. In some embodiments, the dynamic content module 116 resides on a server machine 110 having a memory 112 and at least one processor 114. The dynamic content module 116 can be configured to generate a self-updating e-mail message 130 that comprises dynamic content that can be updated even after the e-mail message 130 is sent. As a result, even if the e-mail message 130 comprises content that becomes inaccurate or irrelevant subsequent to the e-mail message being sent, the content of the e-mail message 130 can dynamically change while the e-mail message 130 is waiting in an e-mail inbox of the recipient. By the time the recipient opens the e-mail message 130, such as via an e-mail client 126 on a computing device 120 having a memory 122 and at least one processor 124, the content of the e-mail message 130 may have been modified to reflect more accurate or more relevant information. The computing device 120 may include, but is not limited to, a desktop computer, a laptop computer, a smart phone, a tablet computer, a wearable computing device, another type of mobile device, or any other programmable machine. The e-mail client 126 may comprise any computer program used to access and manage a user's e-mail.

In some embodiments, the dynamic content module 116 is configured to generate an e-mail message 130 comprising existing content viewable within the e-mail client 126. The dynamic content module 116 can configure e-mail message 130 to initiate a modification, by the e-mail client 126, of the existing content within the e-mail message 130 by the e-mail client 126 subsequent to the e-mail message 130 being sent by the dynamic content module 116. In some embodiments, the e-mail message 130 is configured to initiate the modification by the e-mail client 126 subsequent to the e-mail message 130 being downloaded by the e-mail client 126. The e-mail message 130 may be sent to an e-mail account from which the recipient can view the e-mail message 130 within the e-mail client 126. Any modification to the content of the e-mail message 130 may be viewable within the e-mail client 126 so that the recipient views the most up to date information when viewing the opened e-mail message 130.

In some embodiments, the e-mail message 130 is further configured by the dynamic content module 116 to cause the e-mail client 126 to obtain new content 132 from a remote server. The new content 132 can be used in the modification of the existing content within the e-mail message 130. In some embodiments, the new content 132 comprises information (e.g., profile information, news feed information, information about job openings, event information) from a social networking website (e.g., LinkedIn® or Facebook®). However, it is contemplated that the new content 132 may comprise information from other types of websites as well. Although FIG. 1 shows the new content 132 being obtained from the server machine 110, the new content 132 may be obtained from other sources as well.

The e-mail message 130 can be configured to cause the e-mail client 126 to repeatedly obtain new content at periodic intervals. For example, the e-mail client 126 can obtain new content 132-1 at a first time, then obtain new content 132-2 at a second time after the first time, and so on and so forth N number of times. In some embodiments, the N number of times may be capped, as it may be undesirable to periodically update the e-mail message forever. Such endless retrieval of new content and modification of existing content using the new content could negatively affect the battery life of the computing device 120, which would be especially troublesome for mobile devices. In some embodiments, URL query parameters can be included in the e-mail message 130 or in the new content 132 to help calculate when to finish the periodic updating. Other techniques of limiting the amount of updates may also be employed.

Any of the communication described herein between any of the systems, devices, or modules (e.g., any communication between the dynamic content module 116 and the computing device 120) can be achieved via one or more networks. The network(s) may include any network that enables communication between or among machines, databases, and devices. Accordingly, the network(s) may include a wired network, a wireless network (e.g., a mobile or cellular network), or any suitable combination thereof. The network(s) may include one or more portions that constitute a private network, a public network (e.g., the Internet), or any suitable combination thereof. Other configurations are also within the scope of the present disclosure.

Figure 2A:
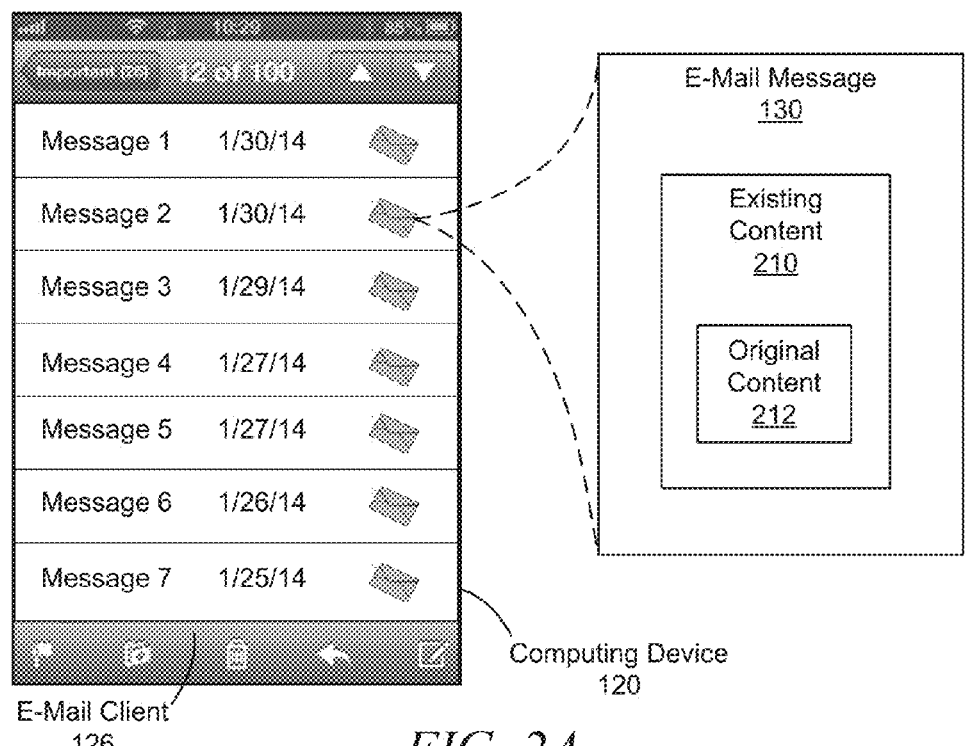
FIGS. 2A-2B are display diagrams illustrating different stages of dynamically updating content of an e-mail message, in accordance with some embodiments.
Figure 2B:
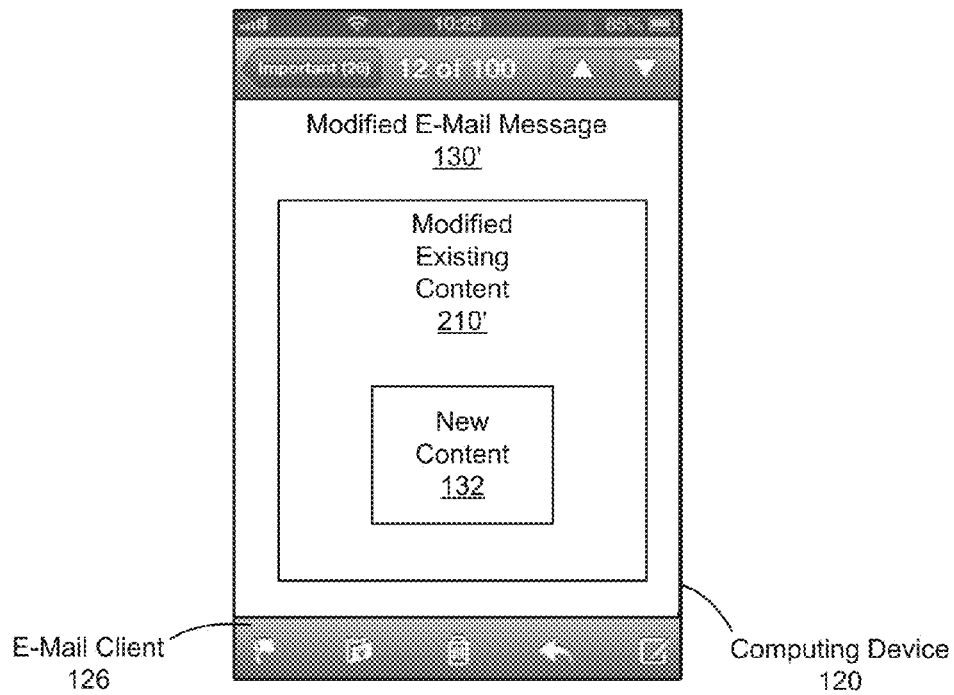

FIGS. 2A-2B are display diagrams illustrating different stages of dynamically updating content of an e-mail message 130, in accordance with some embodiments. In FIG. 2A, a list of e-mail messages, showing Messages 1-7, is displayed within the e-mail client 126 on the computing device 120. Although Message 2 has not yet been opened, FIG. 2A shows the contents of this e-mail message 130 to the right of the computing device 120. As previously discussed, e-mail message 130 in can comprise existing content 210 at one point in time. However, subsequent to the e-mail message 130 being sent or subsequent to the e-mail message 130 being downloaded by the e-mail client 126, the existing content 210 can be modified by the e-mail client. FIG. 2B shows a modified version 130' of the e-mail message 130 being opened and displayed in the e-mail client 126 at a subsequent point in time from the point in time of FIG. 2A. In FIG. 2B, the modified existing content 210' comprises the new content 132, which was not included in the previous existing content 210 in FIG. 2A. Additionally, original content 212 that was included in the unmodified existing content 210 of the unmodified e-mail message 130 in FIG. 2A can be removed and absent from the modified existing content 210' of the modified e-mail message 130' in FIG. 2B.

In some embodiments, the computing device 120 may be offline when the e-mail message 130 is opened. In this case, the e-mail message 130 can still be displayed by the e-mail client 126 (because it has already been downloaded), but the e-mail client 126 will be unable to fetch the dynamic content from the server machine 110 (or from some other source of the dynamic content). One option in this case is to leave blank the area where the dynamic content would otherwise be displayed. However, the blank space might be confusing to the user. Another option is to have the content of the e-mail message 130 fall back to the content at the time when the e-mail message 130 was sent (e.g., the original content 212). This can be achieved by positioning the new content 132 above the original content 212. If the new content 132 fails to load, then the e-mail message 130 simply continues to show the original content 212. This way, the content of the e-mail message 130 will be dynamically updated when possible, but it is still present (albeit possibly outdated) if there is no network connection.

The dynamic updating features disclosed herein can be applied to many different use cases. They may be particularly useful in use cases involving frequently changing and newly added information, such as with information from social network services (e.g., LinkedIn® and Facebook®) and online news services. The features of the present disclosure can be used to provide updates of various types of content, including, but not limited to, a social network profile status, a social network relationship status (e.g., whether members are "connected" or not), and what news and professional content is popular or trending at the moment. Other types of content and use cases are also within the scope of the present disclosure.

Referring back to FIG. 1, the dynamic content module 116 can also be configured to enable the recipient of the e-mail message 130 to initiate the loading of a page within another application 128 (e.g., a web browser or a mobile application) on the computing device 120 while viewing the opened e-mail message 130 within the e-mail client 126. As the recipient is viewing the loaded page within the other application 128, the recipient can cause the performance of an action from within that page (or from another page associated with the same website or application). After completion of the action, the recipient may return to the e-mail client 126 on the computing device 120, where a modification of the e-mail message 130 can be displayed to the recipient within the e-mail client 126. This modification can reflect the performance of the action.

Figure 3C:
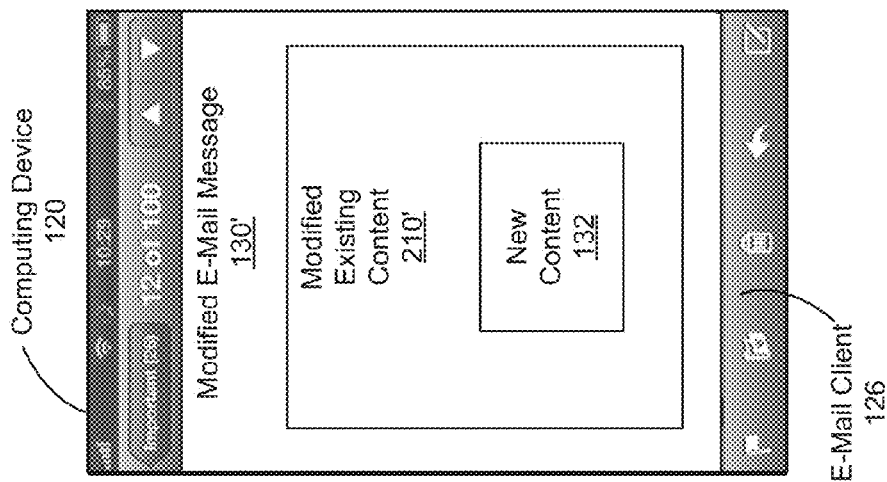
FIGS. 3A-3C are display diagrams illustrating different stages of dynamically updating content of an e-mail message, in accordance with some embodiments.
Figure 3B:
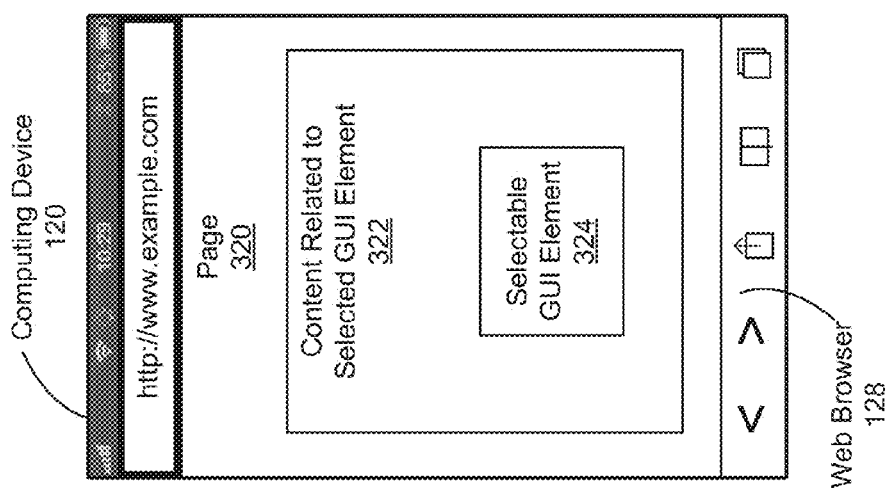
Figure 3A:
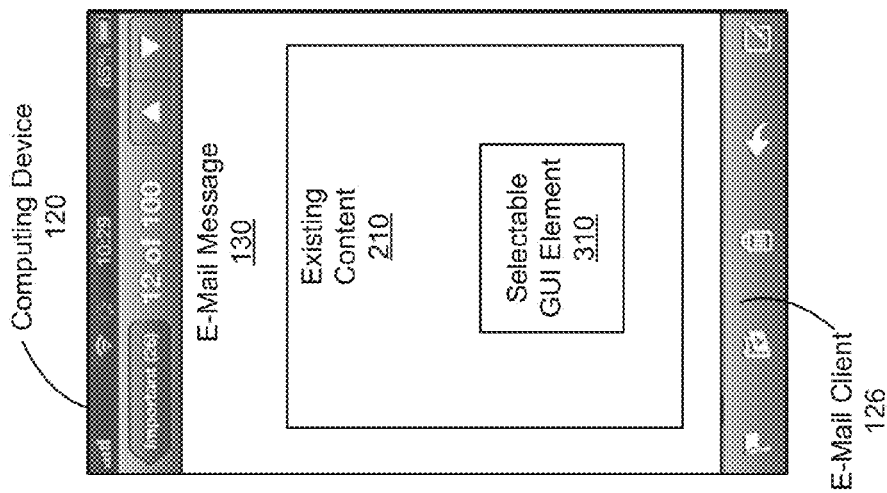

FIGS. 3A-3C are display diagrams illustrating different stages of dynamically updating content of an e-mail message, in accordance with some embodiments. In FIG. 3A, the existing content of the e-mail message 130 is being viewed within the e-mail client 126 on the computing device 120. The existing content 310 can comprise a selectable graphical user interface (GUI) element 310 configured to initiate an action. As seen in FIG. 3B, in some embodiments, the selectable GUI element 310 is configured to cause, in response to its selection, the loading of a page 320 from which the action can be performed. The page 320 can be loaded within another application on the computing device 120, such as within a web browser 128. The page 320 may comprise content 322 related to the selected GUI element 310. This content 322 may comprise another selectable GUI element 324 with which the recipient may cause the performance of an action. After the performance of this action, the recipient may be returned to the e-mail client 126 on the computing device 120, where he or she may be presented with a modified version of the e-mail message 130' having a modified version of the existing content 210'. The modified version of the existing content 210' may comprise or otherwise be based on new content 132 that has been obtained by the e-mail client 126 subsequent to the performance of the action, thereby enabling the modified version of the e-mail message 130' being viewed by the recipient to reflect the performance of the action.

In one example, the e-mail message 130 in FIG. 3A can be a message from a social networking website and reflect in the existing content 210 that the recipient is not connected with another member of the social networking website. The e-mail message 130 can comprise an invitation to connect with the other member via the selectable GUI element 310. The recipient can select the selectable GUI element 310 and be taken to a page 320 of the social networking website, in FIG. 3B, where the recipient can connect with the other member or invite the other member to be connect with the recipient, such as via a selection of the selectable GUI element 324. When the recipient returns to the e-mail client 126 in FIG. 3C, a modified version of the e-mail message 130' may be displayed, with its modified existing content 210' reflecting the fact that the recipient is now connected with the other member or has invited the other member to connect on the social networking website. An indication of this new status related to the other member may be presented as the new content 132. This dynamic updating can be applied to any selectable button in an e-mail message 130 that initiates an action. Other examples are also within the scope of the present disclosure.

It is contemplated that the dynamic content module 116 may use a variety of different techniques to configure the e-mail message 130 to cause the e-mail client 126 to obtain the new content 132. In some embodiments, the dynamic content module 116 inserts an IFrame element into the e-mail message 130. This IFrame element can be configured to cause the e-mail client 126 to obtain the new content 132. In some embodiments, the IFrame element may be integrated into the body of the e-mail message 130. An example of an HTML body incorporating an IFrame element may include the following:

```
<html>
<body>
<p>Hello email reader</p>
<iframe class="widget" src="https://example.com/emails/new-content" />
</body>
</html>
```

The IFrame can then be styled with Cascading Style Sheets to either call it out as a separate part of the e-mail message 130 that updates dynamically, or the IFrame can be made borderless, and the new content 132 that is loaded can itself be styled to look like the original e-mail message 130. The latter option helps the dynamic content appear to the recipient as a fairly seamless part of the original e-mail message 130.

By using the above technique, in some embodiments, content can be shown to the user that is generated at the time an e-mail message 130 is opened, rather than at the time the e-mail message 130 was downloaded.

In some embodiments, the page that "https://example.com/emails/new-content" in the above example responds with is a standard HTML document. This technique can be extended further by having that new page contain instructions for when it should be automatically reloaded. For example, to have the dynamic content refresh itself every 5 seconds, the /emails/new-content document may itself contain a <meta> HTML tag, thus:

```
<html>
<head>
<meta http-equiv="refresh" content="5;https://example.com/emails/new-content"/>
</head>
<body>
<!-- content goes here -->
</body>
</html>
```

In some embodiments, the meta element tells the e-mail client 126 that in 5 seconds it should load the specified URL to replace the existing IFrame content. The document that is loaded from that subsequent URL can either also contain a meta tag to ensure that another refresh occurs, or it can omit a meta tag if periodic updates are complete.

In addition to the meta http-equiv="refresh" technique discussed above, an HTTP Refresh header can also be employed within the scope of the present disclosure.

Another technique that can be employed is to include a dynamically-generated image in the e-mail message 130. Similar to the IFrame contents, the image could be fetched from a server. The contents of the image can be generated by the server on demand, so that the contents of the image can be up-to-date.

Figure 4:
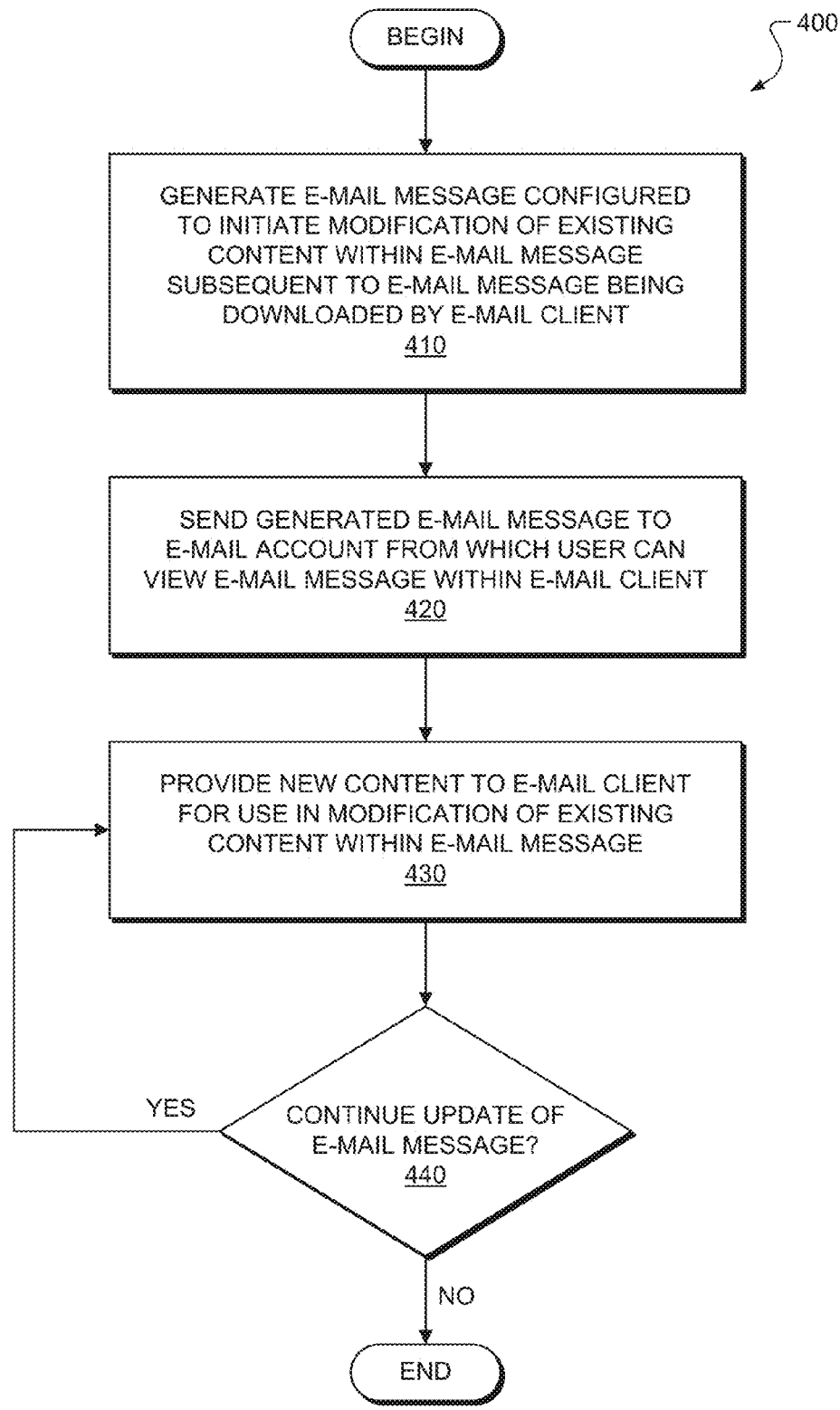
FIG. 4 is a flow diagram illustrating a method of dynamically updating content of an e-mail message, in accordance with some embodiments.

FIG. 4 is a flow diagram illustrating a method 400 of dynamically updating content of an e-mail message, in accordance with some embodiments. It is contemplated that the operations of method 400 may be performed by a system or modules of a system (e.g., dynamic content module 1116 in FIG. 1). At operation 410, an e-mail message 130 comprising existing content 210 viewable within an e-mail client 126 can be generated. The e-mail message 130 can be configured to initiate a modification of the existing content 210 within the e-mail message 130 by the e-mail client 126 subsequent to the e-mail message 130 being downloaded by the e-mail client 126. The modification of the existing content 210' can be viewable within the e-mail client. At operation 420, the generated e-mail message 130 can then be sent to an e-mail account from which a user can view the e-mail message 130 within the e-mail client 126. At operation 430, new content 132 can be provided to the e-mail client 126 for use in modifying the existing content 210 within the e-mail message 130. At operation 440, it is determined whether or not the content of the e-mail message 130 should be updated again after a certain period of time. If it is determine that another dynamic update of the content in the e-mail message 130 should be performed, then the method 400 returns to operation 430, where subsequent new content 132 can be provided to the e-mail client 126 for use in modifying the content within the e-mail message 130. If it is determined that another dynamic update should not be performed, then the method 400 may come to an end. It is contemplated that the operations of method 400 may incorporate any of the other features disclosed herein.

Figure 5:
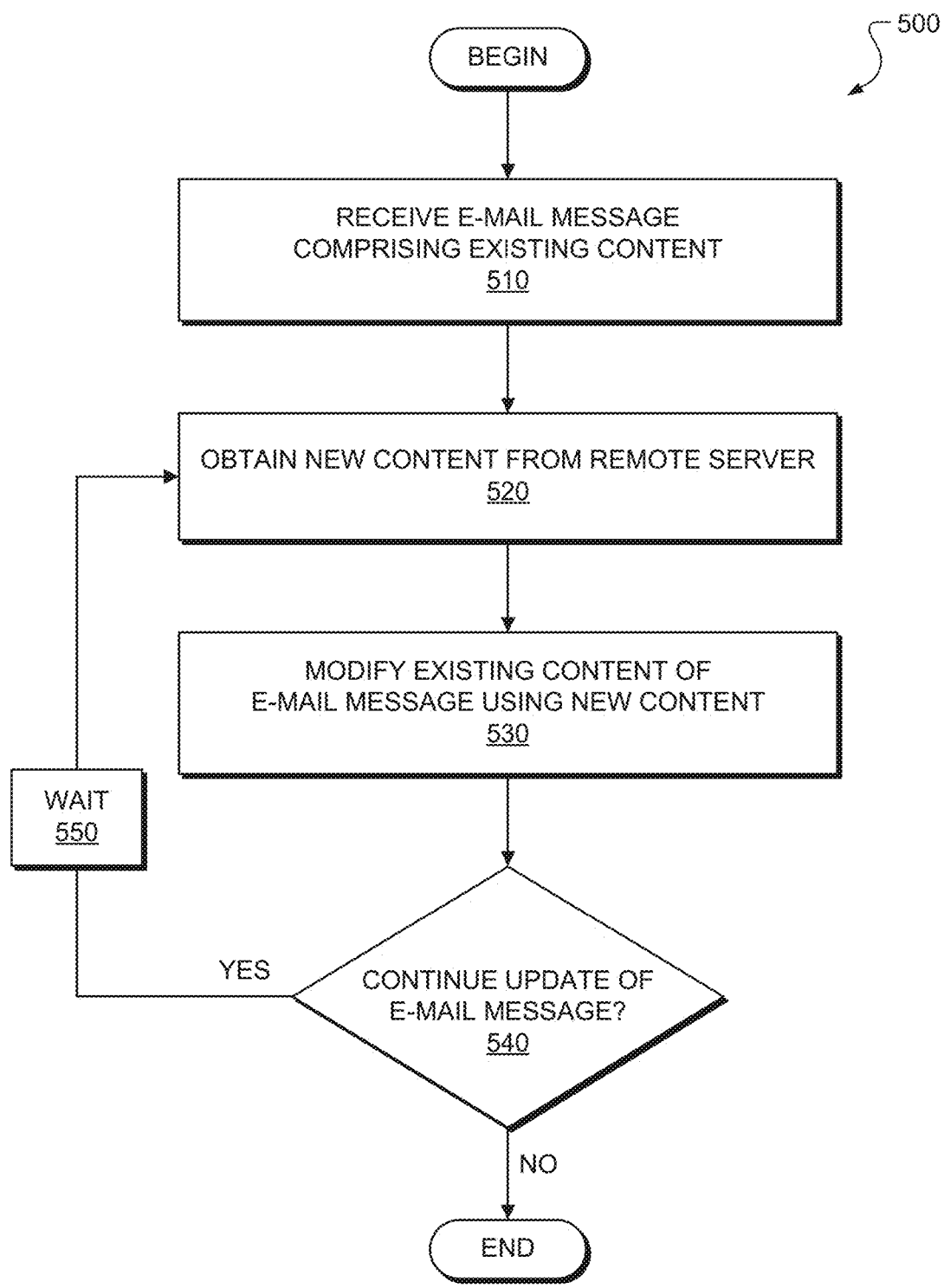
FIG. 5 is a flow diagram illustrating another method of dynamically updating content of an e-mail message, in accordance with some embodiments.

FIG. 5 is a flow diagram illustrating a method 500 of dynamically updating content of an e-mail message, in accordance with some embodiments. It is contemplated that the operations of method 500 may be performed by a system or modules of a system (e.g., e-mail client 126 in FIG. 1). At operation 510, an e-mail message 130 can be received. The e-mail message 130 can comprise existing content 210 viewable within an e-mail client 126. At operation 520, new content 132 can be obtained from a remote server. This operation may be performed in response to code within the e-mail message 130. At operation 530, the existing content 210 of the e-mail message 130 can be modified using the new content 132. At operation 540, it is determined whether or not the content of the e-mail message 130 should be updated again after a certain period of time. If it is determined that another dynamic update of the content in the e-mail message 130 should be performed, then the method 500 returns to operation 520, where subsequent new content 132 can be obtained for use in modifying the content within the e-mail message 130. In some embodiments, a wait operation 550 can be performed before the method 500 returns to operation 520, in order to accommodate a refresh time (e.g., a 5-second refresh time). If it is determined that another dynamic update should not be performed, then the method 500 may come to an end. It is contemplated that the operations of method 500 may incorporate any of the other features disclosed herein.

The features of the present disclosure enable a user to be presented with fresh up-to-date information or data relating to an e-mail message every time the user opens that e-mail message. For example, a user can be sent an email message that refers to an event occurring at a specific date, time, or place. After the message is sent, unbeknownst to the sender, the event is moved to a different date, time, or place. When the user opens the e-mail message, the user is presented with the most up-to-date date, time, or place for the event, regardless of what those specifics were in the originally sent e-mail message.

The techniques and features disclosed herein can be applied to both messages that are downloaded by an e-mail client, as well as messages downloaded by an e-mail server accessible by the e-mail client for viewing of e-mail messages sent to the user (e.g., an e-mail server hosting and managing the e-mails of the user's e-mail account). The techniques and features disclosed herein can be applied to both an IMAP-style implementation, as well as a POP-style implementation.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
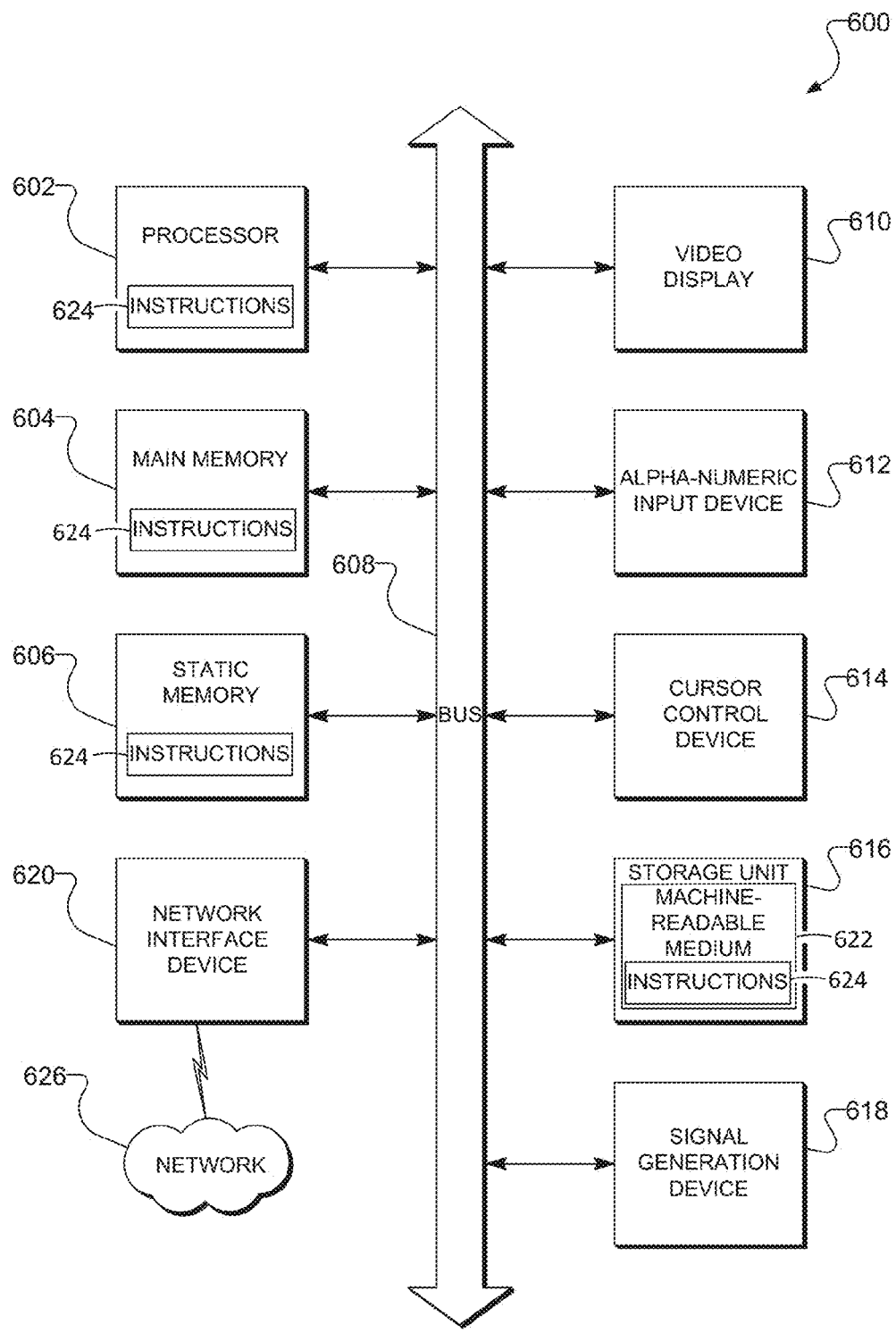
FIG. 6 is a block diagram of an example computer system on which methodologies described herein may be executed, in accordance with some embodiments.

FIG. 6 is a block diagram of an example computer system 600 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

generating, by a server machine having a memory and at least one processor, an e-mail message comprising existing content viewable within an e-mail client, the e-mail message being configured to initiate a modification of the existing content within the e-mail message by the e-mail client subsequent to the e-mail message being downloaded by the e-mail client, the modification of the existing content being viewable within the e-mail client, and the e-mail message being further configured to cause, prior to the e-mail message being opened, the e-mail client to obtain new content from a remote server for use in the modification of the existing content within the e-mail message, the e-mail message being further configured to perform periodic modifications to the modified existing content within the e-mail message, the e-mail message causing the e-mail client to repeatedly retrieve periodic new content at periodic intervals to use in the periodic modifications;

sending, by the server machine, the generated e-mail message to an e-mail account from which a user can view the e-mail message within the e-mail client;

determining a stop time at which to finish the periodic modifications to the modified existing content; and causing the termination of the periodic modifications to the modified existing content.

2. The method of claim 1, wherein the e-mail message comprises an IFrame element configured to cause the e-mail client to obtain the new content from the remote server.

3. The method of claim 1, further comprising including a meta element in the new content, wherein the meta element is configured to cause the e-mail client to load a specified Uniform Resource Locator (URL) and to obtain subsequent new content from the specified URL for a subsequent modification of the modified existing content within the e-mail message.

4. The method of claim 3, wherein the meta element is further configured to cause the e-mail client to load the specified URL at a specified time.

5. The method of claim 1, wherein the new content comprises information from a social networking website.

6. The method of claim 1, wherein the existing content comprises a selectable graphical user interface element configured to initiate an action.

7. The method of claim 6, wherein the selectable graphical user interface element is configured to cause, in response to its selection, a loading of a page from which the action can be performed.

8. A system comprising:

a server machine having a memory and at least one processor coupled to the memory; and a dynamic content module, executable by the at least one processor, configured to:

generate an e-mail message comprising existing content viewable within an e-mail client, the e-mail message being configured to initiate a modification of the existing content within the e-mail message by the e-mail client subsequent to the e-mail message being downloaded by the e-mail client, the modification of the existing content being viewable within the e-mail client, and the e-mail message being further configured to cause, prior to the e-mail message being opened, the e-mail client to obtain new content from a remote server for use in the modification of the existing content within the e-mail message, the e-mail message being further configured to perform periodic modifications to the modified existing content within the e-mail message, the e-mail message causing the e-mail client to repeatedly retrieve periodic new content at periodic intervals to use in the periodic modifications;

send the generated e-mail message to an e-mail account from which a user can view the e-mail message within the e-mail client;

determine a stop time at which to finish the periodic modifications to the modified existing content; and cause the termination of the periodic modifications to the modified existing content.

9. The system of claim 8, wherein the e-mail message comprises an IFrame element configured to cause the e-mail client to obtain the new content from the remote server.

10. The system of claim 8, wherein the dynamic content module is further configured to include a meta element in the new content, wherein the meta element is configured to cause the e-mail client to load a specified Uniform Resource Locator (URL) and to obtain subsequent new content from the specified URL for a subsequent modification of the modified existing content within the e-mail message.

11. The system of claim 10, wherein the meta element is further configured to cause the e-mail client to load the specified URL at a specified time.

12. The system of claim 8, wherein the new content comprises information from a social networking website.

13. A non-transitory machine-readable medium embodying a set of instructions that, when executed by a processor, cause the processor to perform operations, the operations comprising:

generating an e-mail message comprising existing content viewable within an e-mail client, the e-mail message being configured to initiate a modification of the existing content within the e-mail message by the e-mail client subsequent to the e-mail message being downloaded by the e-mail client, the modification of the existing content being viewable within the e-mail client, and the e-mail message being further configured to cause, prior to the e-mail message being opened, the e-mail client to obtain new content from a remote server for use in the modification of the existing content within the e-mail message, the e-mail message being further configured to perform periodic modifications to the modified existing content within the e-mail message, the e-mail message causing the e-mail client to repeatedly retrieve periodic new content at periodic intervals to use in the periodic modifications;

sending the generated e-mail message to an e-mail account from which a user can view the e-mail message within the e-mail client;

determining a stop time at which to finish the periodic modifications to the modified existing content; and causing the termination of the periodic modifications to the modified existing content.

* * * * *